United States Patent [19]

Lee

[11] Patent Number: 4,937,783

[45] Date of Patent: Jun. 26, 1990

[54] PERIPHERAL CONTROLLER FOR EXECUTING MULTIPLE EVENT-COUNT INSTRUCTIONS AND NONEVENT-COUNT INSTRUCTIONS IN A PRESCRIBED PARALLEL SEQUENCE

[75] Inventor: Sai-Keung Lee, Milpitas, Calif.

[73] Assignee: Advanced Micro Devices, Inc., Sunnyvale, Calif.

[21] Appl. No.: 86,323

[22] Filed: Aug. 17, 1987

[51] Int. Cl.⁵ ............................................. G06F 9/00
[52] U.S. Cl. .................................. 364/900; 364/933; 364/933.2; 364/938
[58] Field of Search .............................. 364/200, 900

[56] References Cited

U.S. PATENT DOCUMENTS

| 4,458,316 | 7/1984 | Fry et al. | 364/200 |
| 4,573,118 | 2/1986 | Damouny et al. | 364/200 |
| 4,594,655 | 6/1986 | Hao et al. | 364/200 |

Primary Examiner—Gareth D. Shaw
Assistant Examiner—John G. Mills
Attorney, Agent, or Firm—Skjerven, Morrill MacPherson, Franklin & Friel

[57] ABSTRACT

A typical peripheral system includes a control path and a data path along with a peripheral controller that processes different type of instructions for control and data paths. Since control and data paths are not independent of each other, it is necessary to either combine these two types of instructions in a single instruction or execute these two types of instructions in a prescribed manner so that a control path instruction can be executed while a data path instruction is being executed. The data path instructions (which may also be called event-count instructions) includes serialization and deserialization of data and other information such as ECC, and typically have lengths of events, or fields, typically in words and bytes associated with them. Control instructions (which may also be referred to as nonevent-count instructions) include setting of tag patterns, branching or jumping or typically have no fields of data associated with them. In the present invention, the peripheral controller can execute nonevent-count instructions before the end of a previous event-count instruction, and when a next event-count instruction is fetched, it must wait for the end of a previous event-count instruction before the new event-count instruction can be executed. In this way, all nonevent-count instructions between two event-count instructions, for both contiguous and noncontiguous event-count instructions, can be executed in sequence, and the timing dependencies between these two different types of instructions can be maintained.

12 Claims, 7 Drawing Sheets

Operations in various states:

S1: I1(6:0) = 0000000. I2(7:0) = 00000000. Fetch I(7:0)

S2: I1(6:0) = I(6:0). I2(7:0) stays. Determine next address.

S3: I1(6:0) = 0000000. I2(7:0) = I(7:0). Determine next address.

S4: Fetch I(7:0).

S5: I1(6:0) = 0000000. I2(7:0) stays. Hold current address.

PERIPHERAL CONTROLLER FOR EXECUTING MULTIPLE EVENT-COUNT INSTRUCTIONS AND NONEVENT-COUNT INSTRUCTIONS IN A PRESCRIBED PARALLEL SEQUENCE

FIELD OF THE INVENTION

This invention relates to a data processing system and in particular to a peripheral device system that processes data and multiple instructions.

BACKGROUND OF THE INVENTION

High performance peripheral systems associated with computers or central processing units generally employ multiple processors and may include microprocessors or microcontrollers with peripheral controllers. The microprocessor serves to process a command that is passed to the peripheral system from the host computer which controls the peripheral controller. However, the microprocessor is too slow for high performance peripheral control because it is limited by its instruction cycle.

A typical peripheral controller includes a control path and a data path. The system including the peripheral controller processes different type of instructions for the control and data paths. If the control and data paths are blended or mixed, the system will be limited and will not be sufficiently flexible because the processing of data must be time-shared with the control path and dedicated logic circuitry is required for high performance processing of data. The data path normally operates on a certain number of bytes of data and data-like information. When an instruction on a data path is executed, it needs to be executed for as long as the corresponding data field is being processed. In contrast, an instruction on a control path is executed only once when called.

Peripheral controllers that are currently available include an internal sequencer. Generally, for each specific task, a sequencer is dedicated to perform the task in response to a command or instruction from a microprocessor. The sequencer enables the controller to respond to the commands from the microprocessor in a sequential manner or according to rank or time of the commands. The flexibility of the design of the controller is limited by the specific requirements of the user.

Pipeline architecture can allow several instructions to be executed simultaneously, but due to the fixed instruction cycles, it cannot be used in the described peripheral systems.

SUMMARY OF THE INVENTION

An object of this invention is to provide a method and means for executing instructions of different instruction cycles in a single processing unit.

Another object of this invention is to allow parallel execution of multiple instructions in a single processing unit and to allow the simultaneous execution of instructions in a prescribed sequence.

In accordance with this invention, instructions received by a peripheral controller are processed by a sequencer and are separated into event-count and nonevent-count instructions. An event-count instruction is an instruction that is interpreted to serialize, deserialize, shift check bits, or generate an error pattern, for example. An event-count instruction on a data path is executed for the length of time that a corresponding data field is being processed. A nonevent-count instruction which is directed on a control path is executed only once when called. A nonevent-count instruction may be a jump instruction, an instruction to set read or write gates, an instruction to load data from an instruction memory to other locations, a wait signal or a no-operation command, by way of example.

In an implementation of this invention, a sequence of the event-count and nonevent-count instructions is executed so that the event-count instructions are contiguous, while the nonevent-count instructions between two event-count instructions are executed in parallel once the first event-count instruction begins to be executed. In order to track the instructions, only nonevent-count instructions between two event-count instructions can be executed. Once the second event-count instruction is encountered, no more instruction fetch is allowed until the second event-count instruction begins to be executed.

BRIEF DESCRIPTION OF THE DRAWING

The invention will be described with reference to the drawings in which.

DETAILED DESCRIPTION OF THE INVENTION

Figure 1:
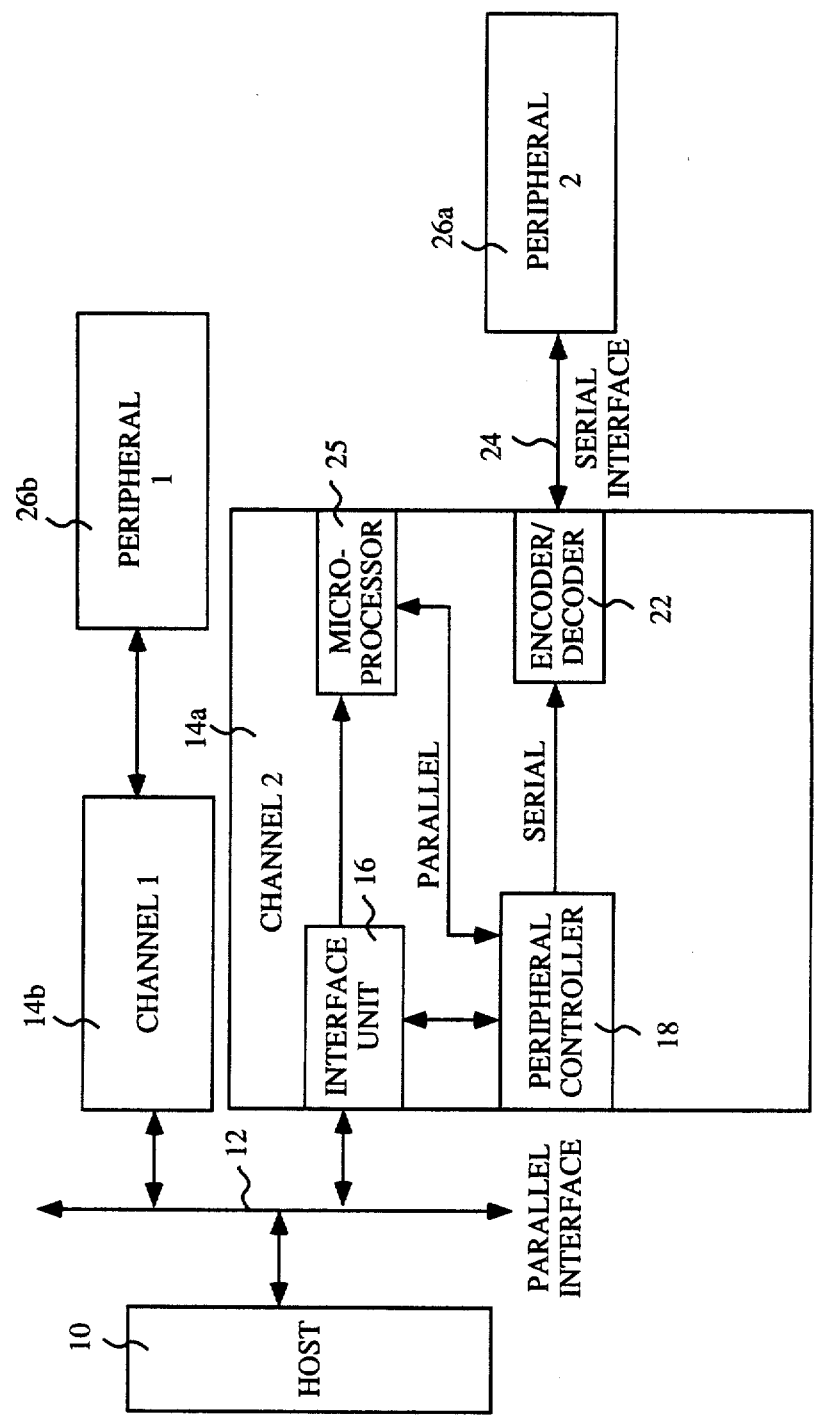
FIG. 1 is a block diagram of a typical peripheral system.

As illustrated in FIG. 1, a typical peripheral system includes a host computer 10 which provides signals of parallel bits through a parallel interface 12 to a plurality of channels 14a, 14b, . . . , 14n. Each channel includes an interface unit 16 for receiving a data or instruction signal of parallel bits and for directing the signal to a peripheral controller 18. The controller 18 is disposed between the parallel data bus from the host computer 10 and the serial data from a peripheral device 26a, 26b, . . . , such as a disk drive. The controller 18 includes the novel sequencer 20 of this invention, which is depicted in the block diagram of FIG. 2. Serialized signals are provided from/to the controller 18 to/from an encoder/decoder 22 for encoding/decoding the processed signals that are applied to/from a peripheral device 26a, 26b, . . . through a serial interface 24. A microprocessor 25 processes read and write data signals and communicates with the peripheral controller 18. The microprocessor also receives instruction signals from the host 10 through the interfaces 12 and 16.

The peripheral controller 18 includes two registers that load and unload data and serve as a "mailbox" between the microprocessor 25 and the sequencer 20 (FIG. 3) of the peripheral controller 18. When the sequencer reads the data, such as in a count-key data process, data skipping may occur when there is a defect in the medium on which the data is registered. After reading the header information in a data string, and examining what is logged in the error log, the microprocessor 25 has a record of the location of the data defects and therefore can skip over the defect area. At the start of data it is assumed that the first segment, which usually contains 32 bytes, is valid. While accessing the data, the microprocessor determines where the skip is and programs a new event-count for the data. After the 32 bytes have been processed, if there is no skip signal sensed, it will proceed to fetch the next few segments of data until a skip is necessary or until the error correction code portion appears, if there is no skip. During this time, the sequencer can signal the microprocessor to load in new information regarding the length of the next set of data by programming certain information in the mailbox, which the microprocessor polls from time to time. The microprocessor receives the information and programs the next set of information to the processing unit. When the defective area is reached, the defective data is ignored using a WAIT command. This procedure continues until the end of data is reached followed by the error correction code (ECC). Depending upon the number of defective regions, the number of skips may vary and if the number of skips is less than three, for example, some instructions need not be executed and the procedure jumps to receiving check bits.

Figure 2:
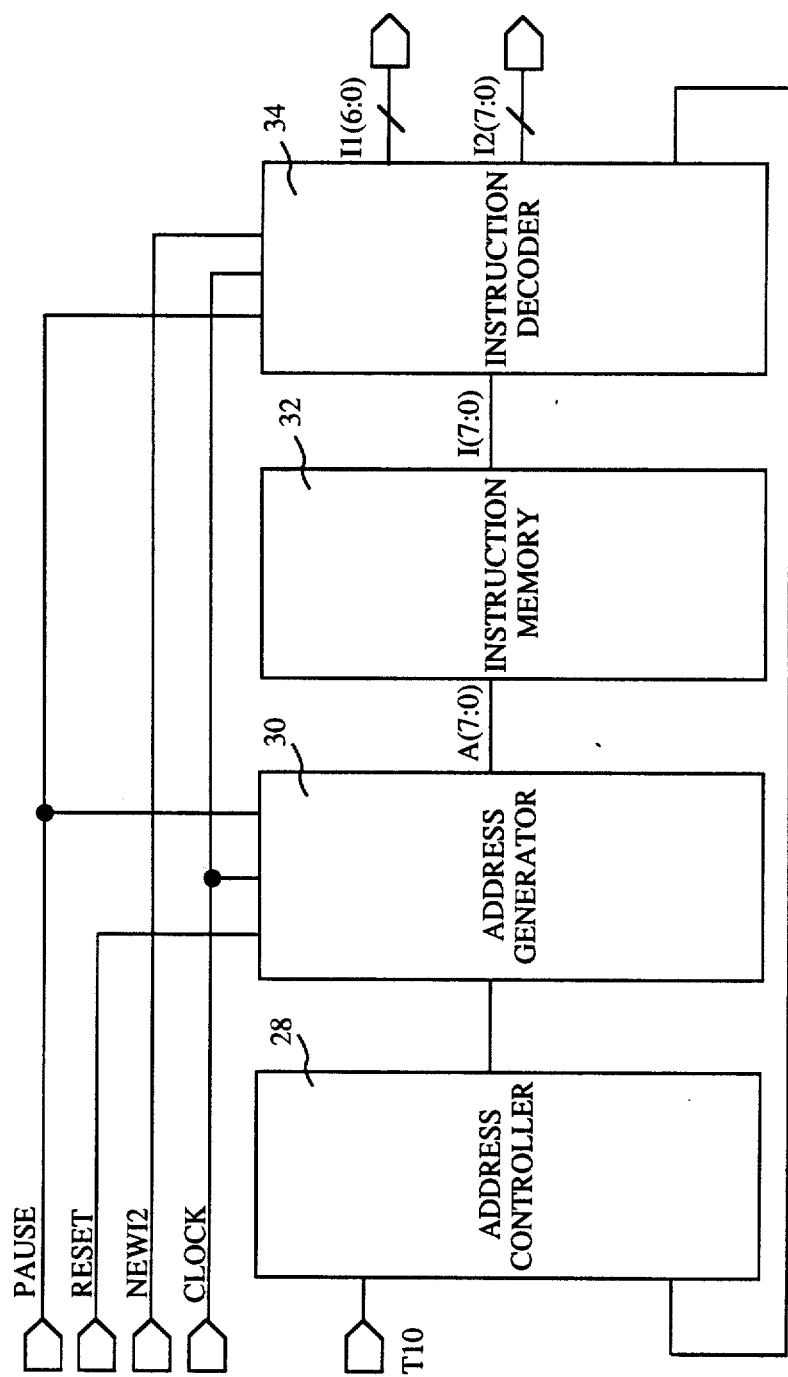
FIG. 2. is a block diagram of a sequencer made in accordance with this invention.

With reference to FIG. 2, a sequencer 20 comprises an address controller 28, an address generator 30 coupled to the output of the controller 28, an instruction memory 32 coupled to the output of the generator 30 and an instruction decoder 34 coupled to the output of the instruction memory 32. A feedback line 36 is coupled between the output of the decoder 34 and the input of the controller 28.

During operation of the sequencer, a clock signal is provided to the address generator 30 and the instruction decoder 34 to synchronize the timing of operation of the sequencer. A RESET signal is provided to initialize the address generator 30. A PAUSE signal is available for application to the address generator and the instruction decoder to force all instruction buses not to perform any operations and to freeze the address generator. A NEWI2 signal is applied to the instruction decoder 34 to indicate that the status of the sequencer is ready to fetch another event-count instruction when the NEWI2 signal is a binary 1.

An input signal at terminal T10 from a STATUS module 48 (FIG. 3) is provided to the address controller 28, in conjunction with feedback signals from the instruction decoder 34 to establish the next address.

The address controller 28 controls the generation of the next address that is processed in the address generator. The next address can be the current address, the next sequential address which is the current address plus one, a jump address, or an interrupt address, for example. The output signal of the address controller 28 is decoded and selection signals are passed to the address generator 30 to generate a new address. The address signal generated by the address generator is then applied to the instruction memory 32 which provides the instruction to the instruction decoder 34. The instruction decoder 34 processes the instruction and passes the processed instruction to the address controller 28 via the feedback path formed by signal line 36. The instruction decoder acts to split instructions into event-count and nonevent-count instructions in response to the type of instruction signal received and processed by the sequencer. Instruction decoder 34 is illustrated schematically in FIG. 4.

The instruction from the instruction memory 32 is an 8-bit instruction I(7:0) that is fed in parallel into the decoder 34 to be split. The instruction is split to a first instruction bus I1(6:0), which accepts up to 7 bits, and a second instruction bus I2(7:0) which is an 8-bit event-count instruction bus. If the sequencer is in a PAUSE mode, when the first instruction arrives, the most significant bit, designated as I7, determines whether the instruction is an event-count or a nonevent-count. If I7 is a binary 1, then it is interpreted as an event-count instruction. If I7 is a binary 0, then it is considered a nonevent-count instruction.

In the event that the first instruction that arrives after a pause indicates that the most significant bit I7 is a binary 1, then I1(6:0) will have a sequence of 0000000, indicating an instruction of no operation (NOOP). If I7 is a binary 0 in the first instruction, then I2(7:0) will read 00000000 indicating an event-count instruction of no operation (NOOP).

A signal designated as NEWI2 received from the event-counter 40 (FIGS. 3 and 5) indicates the end of a previous event-count instruction and ready to fetch the next instruction into I2(7:0). An instruction flow after the first instruction 25 follows this sequence:
- (S1) I1(6:0)=0000000 and when instruction is paused, NEWI2 is 1, indicating ready to fetch another event-count instruction. I2(7:0)=00000000, and on the first instruction, if I7=0, go to (S2), else go to (S3).
- (S2) It is a nonevent-count instruction. Therefore, I1(6:0) =I(6:0), and there is no change in I2(7:0). Determine next address. Go to (S4).
- (S3) It is an event-count instruction and there is no event-count instruction being executed. Therefore, I1(6:0)=0000000; I2(7:0) =I(7:0). NEWI2 from the event-counter 40 (see FIG. 3) will go to 0. Determine next address. Go to (S4).
- (S4) Fetch next address. If I7=0, go to (S2); if I7 =1 and NEWI2=1, go to (S3), else go to (S5).
- (S5) It is an event-count instruction and there is an event-count instruction being executed. Therefore, I1(6:0 =0000000. I2(7:0) stays to continue the previous event-count instruction which has not ended yet. Next address is the current address which waits till NEWI2 goes to 1. Go to (S4).

Figure 4:
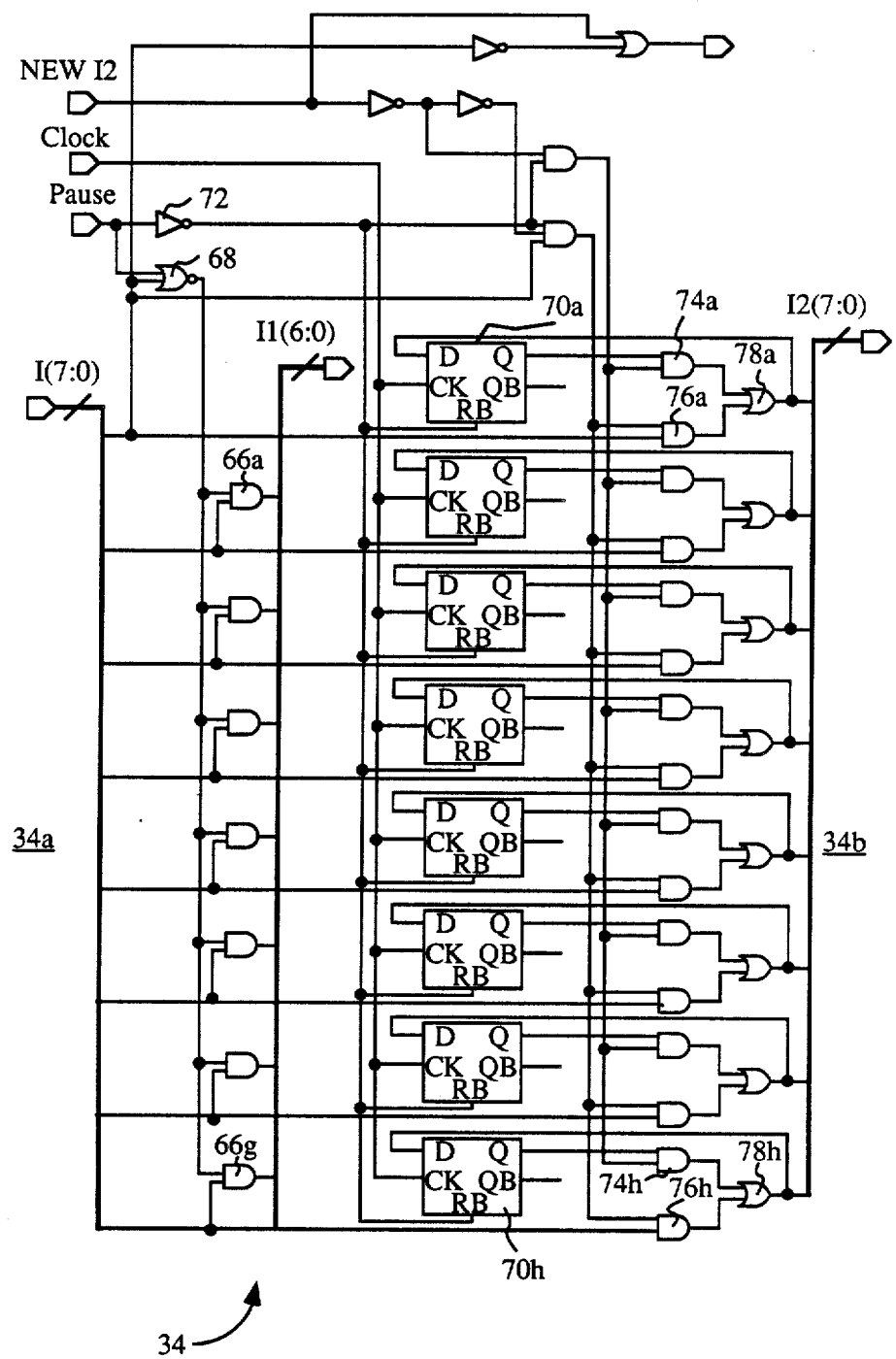
FIG. 4 is a schematic logic diagram of an instruction decoder, as incorporated in the sequencer of FIG. 2.

In the logic diagram of FIG. 4, the logic components of the instruction decoder 34 are depicted. The circuit section 34a of the instruction decoder generates the nonevent-count instruction bus I1(6:0) from the instruction I(7:0). The circuit section 34b generates the event-count instruction bus I2(7:0) from the instruction I(7:0). Section 34a of the logic circuit includes a bank of AND gates 66a-g that generate at bus terminal T60 instruction bits I16, I15 . . . I10, which are I1(6:0) bus signals, in response to signals I7, I6 . . . I0 that are received from the I(7:0) bus terminal M50.

Circuit section 34b of the logic circuit of the instruction decoder comprises a bank of multiplexors that includes D-type flip flops 70a-h, AND gates 74a-7rh, AND gates 76a-76h and OR logic gates 78a-78h. The logic section 34b generates instruction bits I27, I26 . . . I20 on the I2(7:0) bus in response to the input instruction signals I7, I6 . . . I0, and NEWI2.

Figure 7:
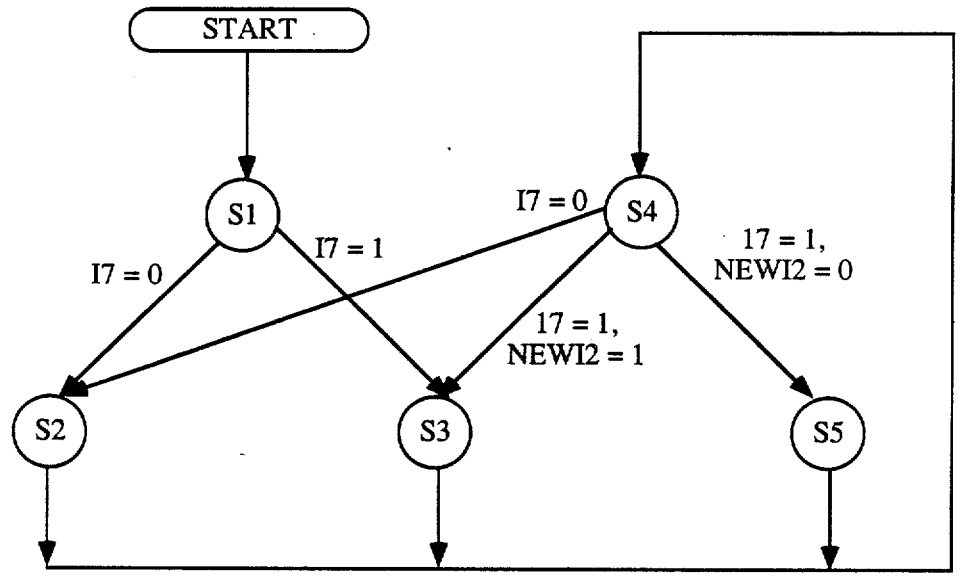
FIG. 7 is a flow diagram to aid in the explanation of this invention.

The state diagram of FIG. 7 illustrates the logic flow of the instruction decoder 34 wherein S1 through S5 correspond to the steps of the logic flow of the sequence set forth above.

Figure 3:
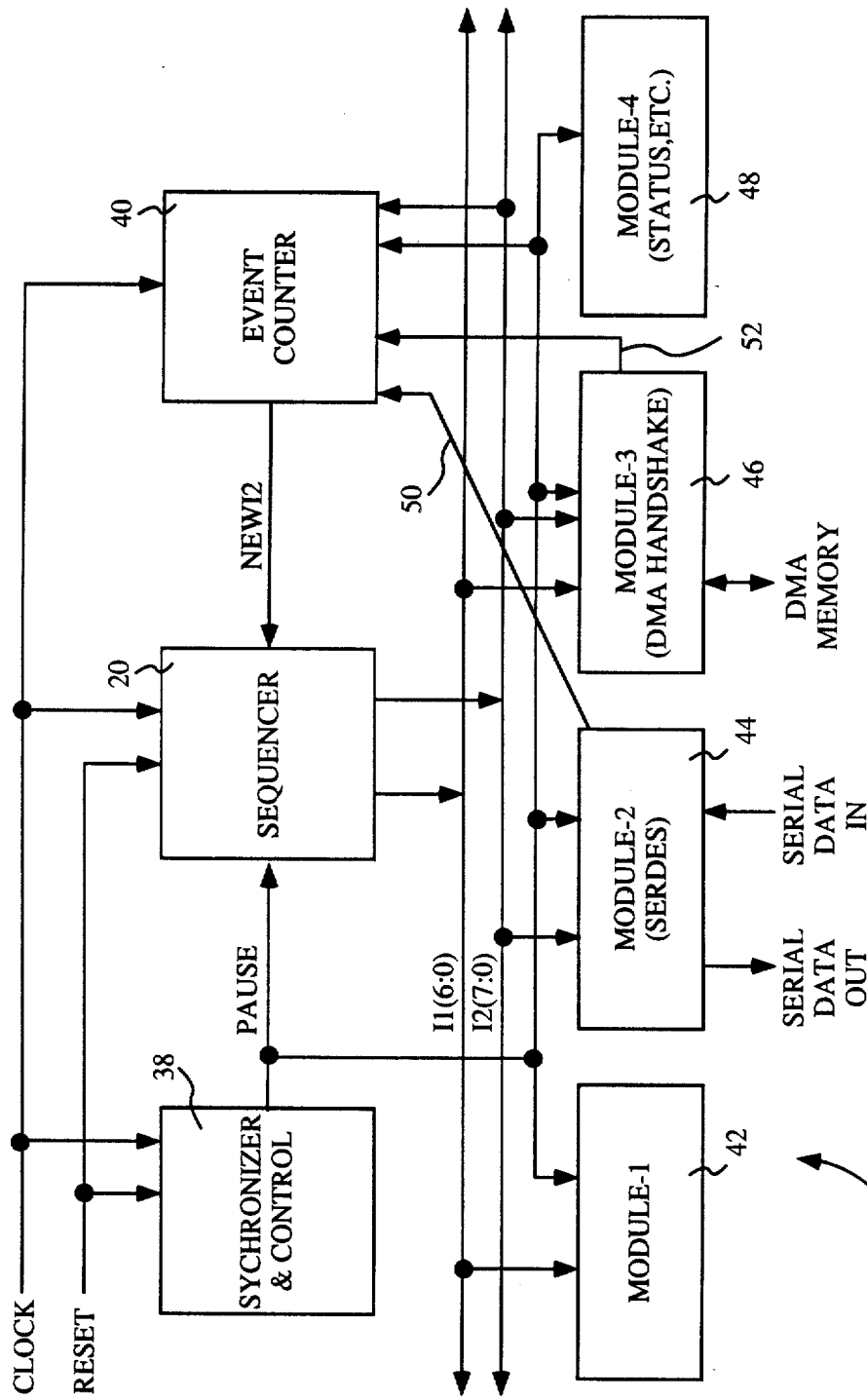
FIG. 3 is a block diagram of a peripheral controller incorporating the novel sequencer of this invention.

The sequencer 20 of the peripheral controller 18 is depicted as in FIG. 3, coupled to the output of a synchronizer and control circuit 38; to an event-counter 40 that provides a NEWI2 instruction signal to the sequencer; and to modules 42, 44, 46 and 48 which receive the output instruction signals that have been divided into event-count and nonevent-count types by the sequencer 20.

During operation of the system, a clock signal is provided to the synchronizer and control circuit 38, sequencer 20 and event-counter 40 to maintain proper synchronization between the operating components of the system. A RESET signal is also provided to the synchronizer and control circuit 38 and to the sequencer 20. The synchronizer and control circuit 38 serves to synchronize the RESET signal and generates a PAUSE signal. PAUSE is asserted whenever RESET is asserted. PAUSE is removed synchronously by a synchronized RESET signal, thus removal of PAUSE always follows the removal of RESET. The synchronizing and control circuit 38 enables the PAUSE signal to be applied to the sequencer 20, event-counter 40, and to the modules 42 through 48. The I1(6:0) nonevent-count instructions and the I2(7:0) event-count instructions from the instruction decoder 34 (shown in FIGS. 2 and 4) are decoded in different ones of the modules. In this embodiment, the module 42 decodes only the I1(6:0) nonevent instructions. Module 44 which is a serializer/-deserializer (SERDES), decodes only the I2(7:0) event-count instructions. The module 46 decodes both types of instructions and deserializes data to or serialize data from a direct access memory (DMA) when the corresponding instruction appears on the I2(7:0) bus. Module 48 which is independent of the instructions can be a counter designating a sector, or RESET index, or status control, or the mailbox as mentioned earlier.

The event-counter 40 controls the fetching of an I2(7:0) instruction. The event-counter 40 communicates with all the modules that decode the I2(7:0) instruction. The counter 40 tracks the number of cycles, which may be clock cycles, direct memory access (DMA) cycles, or the number of bytes over which the instruction is going to be repeated. When the specified number of cycles is reached for the corresponding I2(7:0) instruction, a NEWI2 signal is asserted, and a new instruction appears on the I2(7:0) bus.

If an instruction appears on the I2(7:0) bus to the serialized data to the direct memory access (DMA) memory, then the SERDES module 44 decodes the I2(7:0) instruction. As the instruction is a deserializing instruction, module 44 communicates with the event-counter via signal line 50 and signals the event-counter 40 to count for every byte that is deserialized until the specified number of bytes are all deserialized. In the event a serializing instruction is received from the DMA memory, then the module 46 fetches data from the DMA memory and communicates via line 52 with the event-counter 40 and signals it to count whenever there is a memory transfer until the specified number of bytes from the memory transfer has been processed. When the module 46 is communicating with the event-counter, the module 44 is not in communication with the counter 40.

The PAUSE instruction signal is asserted asynchronously when a RESET is asserted. Upon removal of the RESET signal which is asynchronous, the PAUSE signal is extended and, upon the occurrence of a specified phase of the clock cycle, I6 is removed synchronously to avoid running into a metastable condition. Upon the occurrence of the PAUSE signal, all instructions are terminated to perform no operations. All modules can be individually paused to terminate all operations within the modules.

Figure 5:
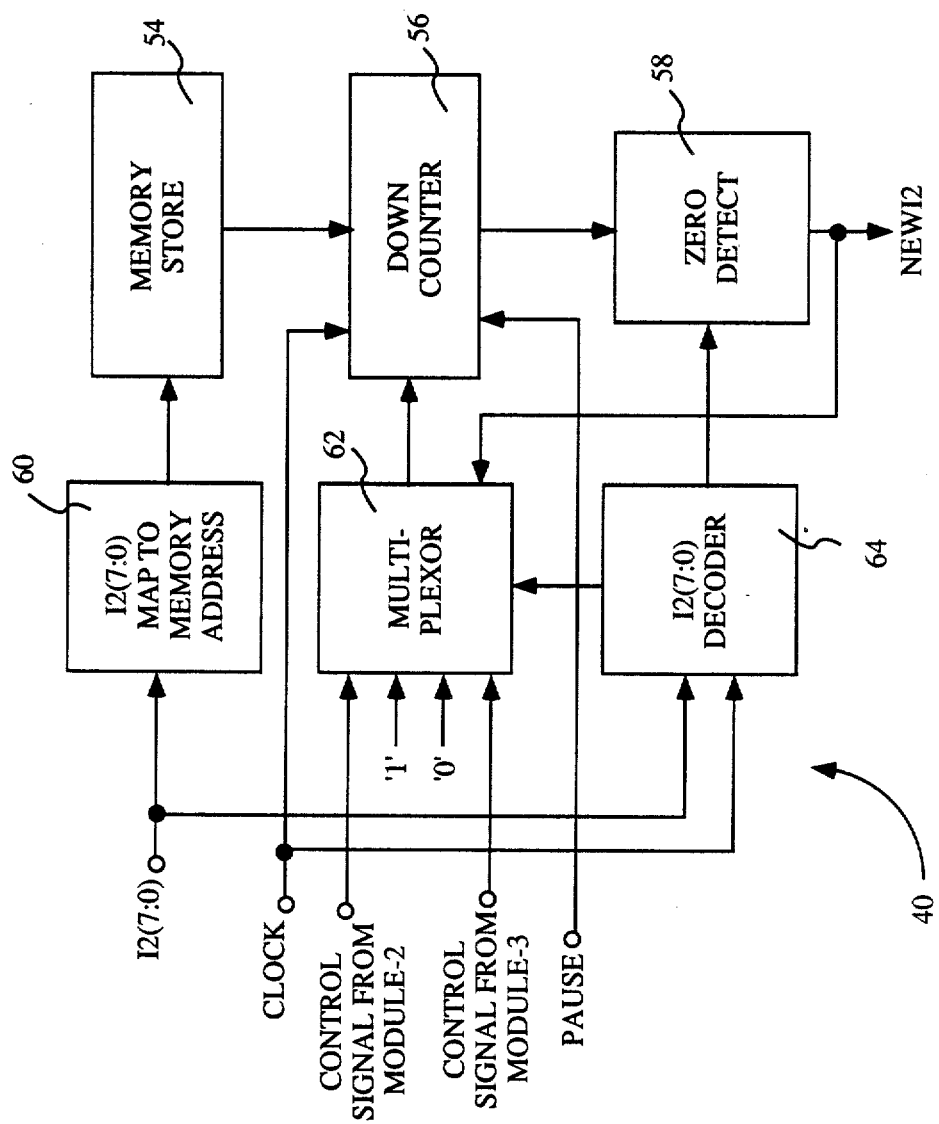
FIG. 5 is a block diagram of an event-counter, such as employed with the sequencer of this invention.

FIG. 5 depicts the event-counter 40 which includes a memory store 54 that stores the event-counts associated with the event-count instruction I2(7:0). On PAUSE, a down counter 56 is reset to zero. A zero detect circuit 58 generates a NEWI2 signal which fetches a new instruction on the I2(7:0) bus. As long as the PAUSE signal is on, the event-count instruction remains at "no operation" (NOOP). When that PAUSE signal is removed, the NEWI2 instruction is already asserted and a new instruction is put on the I2(7:0) bus. The new instruction is mapped in the map to memory address circuit 60 and accesses the event-count memory 54. As the NEWI2 signal is a binary 1, the down counter 56 will be loaded from the data output from the memory store 54. After loading, the event-count is no longer zero and NEWI2 is removed. The I2(7:0) instruction remains on the bus and is decoded in the I2(7:0) decoder 64 to determine the type of instruction. If the instruction is a deserializing instruction, indicating the source of data is from the module 44, the control signal from module 44 is used to determine whether the event-counter 40 should hold or count. If it is a serializing instruction, indicating the source of data is from the module 46, the control signal from module 46 is used to determine whether the counter should hold or count. If the instruction is neither for serializing nor deserializing, a binary 1 is chosen to count always, or if I2(7:0)=00000000 then a binary 0 is chosen to hold the counter at zero, thus to continue asserting NEWI2. The hold/count signals from the modules 44 and 46 and the binary 1 signal are multiplexed in the multiplexor 62 to generate an actual hold/count signal for the down counter 56. After a specified number of cycles, the down counter will be down to zero. The zero detect circuit 58 generates the NEWI2 signal to indicate that a new event-count instruction is ready to be loaded.

Figure 6:
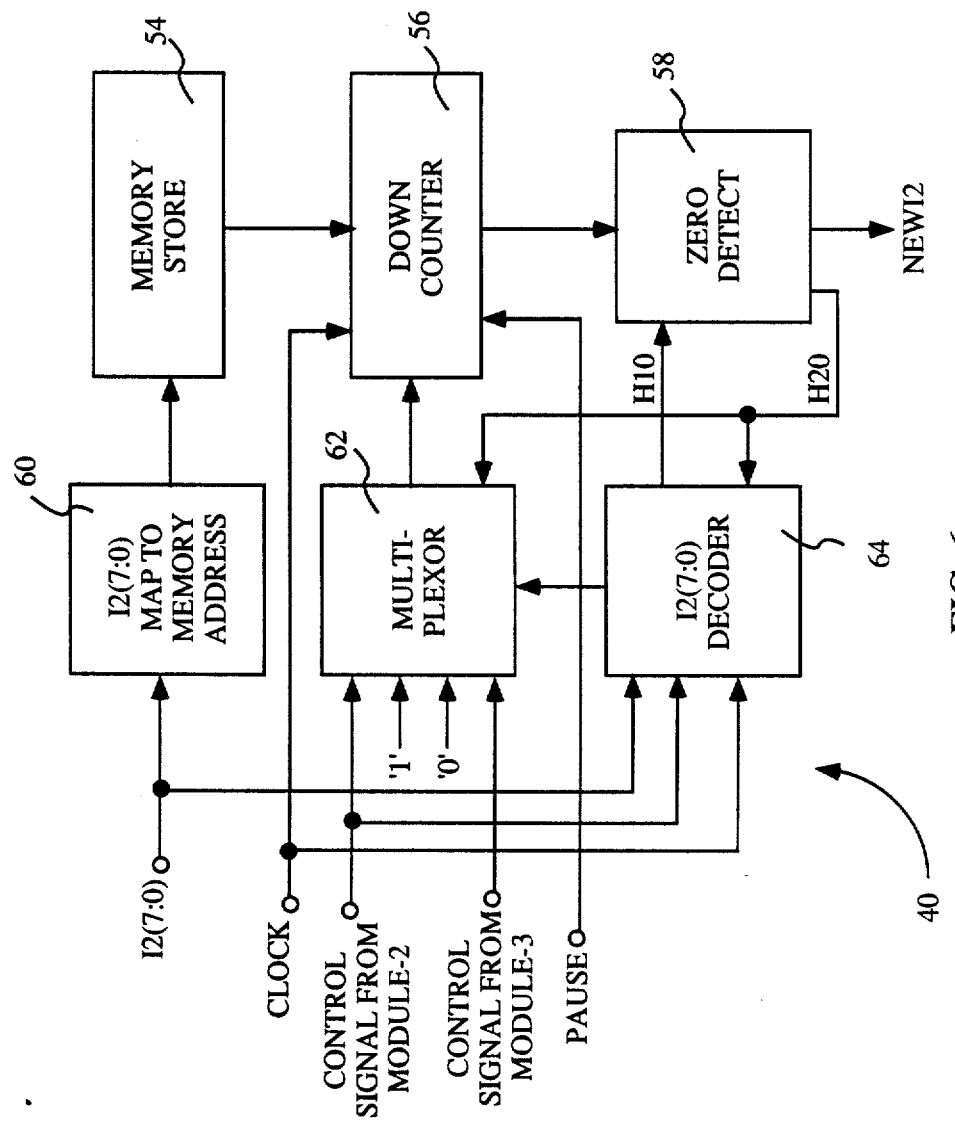
FIG. 6 is a block diagram of the event-counter of FIG. 5 with modification.

During the deserializing function a synchronizing mark (sync mark) for determining the byte boundary is normally detected first. When a "wait for sync mark" (WTS) event-count instruction is executed, the window that detects the appearance of the sync mark is loaded onto the event-counter 40. The next instruction is fetched immediately thereafter. As long as the sync mark has not been detected, the event-counter counts based on the event-count for the sync mark detection window, although the deserializing instruction is on the I2(7:0) bus. When the sync mark is detected, a byte clock appears and the event-counter restarts the count for the deserializing instruction immediately. If the event-counter indicates that the detection window has passed and the sync mark has not been detected, a sync miss will occur. Minor modifications of the embodiment of FIG. 5 can support this function as shown in FIG. 6. The CLOCK signal and the control signal from module —2 also go into the I2(7:0) decoder 64, and a signal (H10) is also used to couple between I2(7:0) decoder 64 and the zero detect 58. I2(7:0) decoder 64 will generate H10 when the WTS instruction appears on the I2(7:0) bus. Zero detect 58 will generate NEWI2 where H10 is asserted, thus allowing the next instruction (a deserializing instruction) to be fetched on the cycle right after WTS is executed. NEWI2 is no longer used to control the multiplexor 62 to load the new event-count, but a signal H20 generated in zero detect 58 which indicates the down counter 56 being all zeros is used instead. H20 is also coupled with the I2(7:0) decoder 64. The CLOCK signal to the I2(770) decoder 64 is used to latch the signals coupled between it and the multiplexor 62 so that although the instruction WTS only occurs on I2(7:0) bus for one cycle, the control to the multiplexor will stay the same until the first byte deserialized has come in, as indicated by the control signal from module—2 being a—1, or until the detection window is over, as indicated by H20 being 1.

By separating instructions into event-count and nonevent-count types, the system becomes more flexible. However, data are contiguous and therefore event-count instructions must be executed in a contiguous manner. Any control of nonevent-count instructions between any two event-count instructions needs to be executed without dropping the first instruction. A sequence of event-count and nonevent-count instructions must be executed so that the event-count instructions are contiguous, while the nonevent-count instructions between two event-count instructions can be executed in parallel with the first event-count instruction once the first event-count instruction begins to be executed. Also, in order to track the instructions, only the nonevent-count instructions between the two event-count instructions can be executed. Once the second event-count instruction is encountered, no further instruction fetch is allowed until the second event-count instruction starts to be executed.

An example of a routine as executed in accordance with this invention follows the following format:

| START: | STTMR | ;nonevent-count instruction to ;start a timer |
| --- | --- | --- |
| | SETTAG 0000 | ;nonevent-count instruction to ;put 0000 on the tag outputs. TAG ;outputs are just general pupose ;outputs for read gate, write gate, ;ECC, etc. |
| | RA | ;event-count instruction to read ;from DMA port A |
| | SETTAG 0010 | ;nonevent-count instruction that ;starts after event-count instruc- ;tion RA has started |
| | SETTAG 0100 | ; |
| | RB | ;event-count instruction to read ;from DMA port B |
| | SETTAG 0001 | ; |
| | PAUSE | ;nonevent-count instruction to ;pause the sequencer |

In time-based, the instructions are executed as follows:

| Instruction Cycle Number | Nonevent-count Instruction Executed (NE) | Event-count Instruction Executed (E) | Comments |
| --- | --- | --- | --- |
| 1 | STTMR | (none) | starting, NE instruction STTMR |
| 2 | SETTAG 0000 | (none) | continuing |
| 3 | (none) | RA | first E instruction RA, which should last for six cycles total |
| 4 | SETTAG 0010 | RA | hold RA, next NE instruction |
| 5 | SETTAG 0100 | RA | next NE instruction |
| 6 | (none) | RA | encounter next E instruction, but RA not done yet, no more fetching |
| 7 | (none) | RA | |
| 8 | (none) | RA | last RA cycle |
| 9 | (none) | RB | E instruction RB started, last for, say, ≧ 3 cycles |
| 10 | SETTAG 0001 | RB | hold RB, next NE instruction |
| 11 | PAUSE | RB | next NE instruction. In the definition here, PAUSE pauses both the sequencer and terminate any event-count instructions still being executed |
| 12 | (none) | (none) | paused |

This approach can be extended and applied to nonevent-count instructions that may last for more than one cycle, and/or even-count instructions that may last for only one cycle. The system disclosed herein can also be utilized so that when an interrupt, a branch or a jump to subroutine occurs, which forces the sequencer to jump to another location, the present even-count instruction will still be able to continue as though no jump had occurred. In this way, the sequencer can finish the execution of the data information.

I claim:

1. A single processing unit for communicating with a peripheral device and for providing instructions to said peripheral device, said single processing unit including a peripheral controller having an input for receiving parallel bit instruction signals from a computer and for processing multiple instruction signals from said computer, wherein said peripheral controller includes a sequencer comprising:

an instruction memory for storing peripheral controller instruction signals formed of parallel bits, said instruction memory having an input for receiving address signals and an output for providing peripheral controller instruction signals;

an address generator for generating address signals for selecting peripheral controller instruction signals stored in said instruction memory, said address generator having an input for receiving control signals and an output for providing address signals;

means coupling the output of said address generator to the input of said instruction memory;

an address controller having input circuit for receiving address control signals and an output for providing control signals to said address generator;

means coupling the output of said address controller to the input of said address generator;

an instruction decoder including means for separating peripheral controller instructions signals into event-count instruction and nonevent-count instructions, said instruction decoder having an input for receiving peripheral controller instruction signals from said instruction memory, and a first output for providing even-count instruction signals and a second output for providing nonevent-count instruction signals; and means coupling the output of said instruction memory to said input of said instruction decoder.

2. A single processing unit as in claim 1, wherein each of said instruction signals from said instruction memory are composed of multiple bits that are fed in parallel from said instruction memory to said instruction decoder.

3. A single processing unit as in claim 2, wherein one of the bits or a combination of a predetermined pattern of bits of said instruction signals received after a pause determines whether said first instruction is an event-count or nonevent-count instruction.

4. A single processing unit as in claim 1, wherein said instruction decoder comprises a first logic circuit for generating nonevent-count instructions and a second logic circuit for generating event-count instructions in response to said instruction signals.

5. A single processing unit as in claim 4, wherein said first logic circuit comprises a first group of AND gates having first and second inputs, first inputs of said AND gates being connected in parallel and coupled to receive a PAUSE signal, and the second input of said AND gates being connected to receive an instruction signal from said instruction memory.

6. A single processing unit as in claim 4, wherein said second logic circuit comprises a plurality of multiplexors including a number of D-type flip-flops, each of said D-type flip-flops having a D-input;
   a second group of AND gates having inputs coupled respectively to the output of said flip-flops;
   a third group of AND gates whose inputs coupled to said instruction memory for receiving instruction signals; and
   a group of logic OR gate inputs respectively coupled to the outputs of said second and third groups of AND gates, wherein the D-inputs of said flip-flops are coupled to the outputs of said logic OR gates.

7. A single processing unit as in claim 6, including means for applying a clock signal to each of said flip-flops.

8. A single processing unit as in claim 1, wherein said peripheral controller comprises:
   a synchronizer and control circuit having a first input for receiving a RESET signal, and a first output coupled to the input of said sequencer, said synchronizer and control circuit including means responsive to the receipt of a RESET signal at said first input for generating a PAUSE signal at said first output of said synchronizer and control circuit;
   module means coupled to said first and second outputs of said instruction decoder included in said sequencer for processing said event-count and nonevent-count instructions; and
   an event-counter having an output coupled to said sequencer for providing a signal to said sequencer for fetching a new instruction.

9. A single processing unit as in claim 8, wherein said module means comprises:
   a first module having an input coupled to said second output of said instruction decoder, said first module including circuit means for decoding nonevent-count instructions;
   a second module having an input coupled to said first output of said instruction decoder, said second module including circuit means for decoding event-count instructions; and
   a third module having a first input coupled to said first output of said instruction decoder, and a second input coupled to said second output of said instruction decoder, said third module including circuit means for decoding both event-count and nonevent-count instructions.

10. A single processing unit as in claim 9, wherein said module means includes a fourth module having an input coupled to said first output of said synchronizer and control circuit, said fourth module including means for providing status control of said peripheral controller.

11. A single processing unit as in claim 8, wherein said event-counter comprises:
   a memory for storing a number representative of the number of cycles included in an event-count instruction, said memory providing said number at an output;
   a down counter having a first input coupled to said output of said memory means for receiving said number representative of the cycles in an event-count instruction and a second input coupled to said module means for receiving cycle counts produced by said module means, said down counter including means for counting down from said number and providing at an output of said down counter a signal indicating that said down counter has reached zero;
   a zero detect circuit having an input coupled to said output of said down counter for detecting when said signal at said output of said down counter indicates that said down counter has reached zero, thereby indicating that the system is ready to process a new instruction signal.

12. A single processing unit as in claim 11, wherein said event-counter further includes:
   a multiplexor coupled to the output of said zero detect circuit and to the input of said down counter;
   means for providing control signals from such second and third modules to said multiplexor; and
   a decoder for receiving an event-count instruction and for decoding said instruction for application to said multiplexor.

* * * * *

UNITED STATES PATENT AND TRADEMARK OFFICE
CERTIFICATE OF CORRECTION

PATENT NO. : 4,937,783

DATED : June 26, 1990

INVENTOR(S) : Sai-Keung Lee

It is certified that error appears in the above-identified patent and that said Letters Patent is hereby corrected as shown below:

Abstract, line 17, "or typically" should read --and typically--.

Col. 4, line 26, after "instruction" please insert --follows this sequence--.

Col. 4, line 27, please delete "25 follows this sequence".

Col. 4, line 62, "74a-7rh" should read --74a-74h--.

Col. 6, line 2, please delete "I6".

Col. 7, line 6, "(770)" should read --(7:0)--.

Col. 7, line 12, "-1" should read --1--.

Col. 8, line 60, Claim 1, "even-count" should read --event-count--.

Signed and Sealed this

Twenty-eighth Day of April, 1992

Attest:

HARRY F. MANBECK, JR.

*Attesting Officer*       *Commissioner of Patents and Trademarks*